US007948111B2

(12) United States Patent
Nigam et al.

(10) Patent No.: US 7,948,111 B2
(45) Date of Patent: May 24, 2011

(54) VERTICAL AXIS WIND SYSTEM

(75) Inventors: Dilip K. Nigam, Ann Arbor, MI (US);
Mohamed E. M. El-Sayed, Bloomfield Hills, MI (US)

(73) Assignee: Analytical Design Service Corporation, Ann Arbor, MI (US)

(*) Notice: Subject to any disclaimer, the term of this patent is extended or adjusted under 35 U.S.C. 154(b) by 9 days.

(21) Appl. No.: 12/324,235

(22) Filed: Nov. 26, 2008
(Under 37 CFR 1.47)

(65) Prior Publication Data
US 2010/0007144 A1 Jan. 14, 2010

(51) Int. Cl.
*F03D 9/00* (2006.01)
*H02P 9/04* (2006.01)
*B64C 27/48* (2006.01)
*F03B 3/12* (2006.01)
*F03D 11/00* (2006.01)
*F04D 29/34* (2006.01)

(52) U.S. Cl. ....... 290/55; 248/125.7; 248/131; 248/690; 248/692; 416/204 R

(58) Field of Classification Search ............... 248/125.7, 248/131, 690, 692; 419/204 R; 290/55; 416/204 R
See application file for complete search history.

(56) References Cited

U.S. PATENT DOCUMENTS

| | | | |
|---|---|---|---|
| 1,427,736 A * | 8/1922 | Hendricks | 24/698.1 |
| 2,177,801 A | 10/1939 | Erren | 290/55 |
| 2,473,134 A * | 6/1949 | Bonnett | 416/226 |
| 2,959,384 A * | 11/1960 | Pavlecka | 244/124 |
| 3,002,567 A * | 10/1961 | Stulen et al. | 416/226 |
| 3,918,839 A | 11/1975 | Blackwell et al. | 416/175 |
| 3,999,888 A * | 12/1976 | Zincone | 416/145 |
| 4,037,989 A | 7/1977 | Huther | 416/197 A |
| 4,082,479 A * | 4/1978 | Rangi et al. | 416/23 |
| 4,112,311 A | 9/1978 | Theyse | 290/44 |
| 4,150,920 A * | 4/1979 | Belko et al. | 416/145 |
| 4,281,965 A | 8/1981 | Stjernholm | 416/227 A |
| 4,285,636 A | 8/1981 | Kato et al. | 416/197 A |
| 4,291,233 A | 9/1981 | Kirschbaum | 290/1 C |
| 4,324,528 A | 4/1982 | Svenning | 416/132 B |
| 4,329,116 A * | 5/1982 | Ljungstrom | 416/19 |

(Continued)

FOREIGN PATENT DOCUMENTS

DE 40 07 017 A1 5/1992

(Continued)

OTHER PUBLICATIONS

International Search Report and Written Opinion—PCT/US07/69956—mailed on Jul. 28, 2008.

*Primary Examiner* — Pedro J Cuevas
(74) *Attorney, Agent, or Firm* — Brinks Hofer Gilson & Lione

(57) ABSTRACT

A vertical axis wind system for use in electrical power generation. The system includes a stationary base including a generator and has an elongate shaft rotatably coupled the base. The elongate shaft extends vertically from a lower end to an upper end along a vertical central axis and engages the generator. At least two arcuate blade assemblies are attached between the lower end and the upper end of the elongate shaft such that aerodynamic forces acting on the at least two arcuate blade assemblies rotate the elongate shaft for the generation of power.

27 Claims, 12 Drawing Sheets

U.S. PATENT DOCUMENTS

| | | | |
|---|---|---|---|
| 4,339,230 A * | 7/1982 | Hill | 416/226 |
| 4,449,053 A | 5/1984 | Kutcher | 290/44 |
| 4,461,957 A | 7/1984 | Jallen | 290/44 |
| 4,464,579 A * | 8/1984 | Schwarz | 290/44 |
| 4,500,257 A * | 2/1985 | Sullivan | 416/32 |
| 4,513,206 A | 4/1985 | Gervasio et al. | 290/4 C |
| 4,525,124 A | 6/1985 | Watson et al. | 416/132 B |
| 4,565,929 A | 1/1986 | Baskin et al. | 290/44 |
| 4,575,311 A * | 3/1986 | Wood | 416/170 R |
| 4,613,763 A | 9/1986 | Swansen | 290/44 |
| 4,764,090 A | 8/1988 | Danson | 416/7 |
| 4,808,074 A | 2/1989 | South | 416/140 |
| 5,127,802 A * | 7/1992 | Carlson et al. | 416/226 |
| 5,133,637 A | 7/1992 | Wadsworth | 415/4.4 |
| 5,151,610 A | 9/1992 | St-Germain | 290/55 |
| 5,171,127 A * | 12/1992 | Feldman et al. | 416/119 |
| 5,183,386 A * | 2/1993 | Feldman et al. | 416/119 |
| 5,203,672 A * | 4/1993 | Wolf | 415/2.1 |
| 5,252,029 A * | 10/1993 | Barnes | 416/142 |
| 5,256,034 A | 10/1993 | Sultzbaugh | 416/91 |
| 5,375,324 A * | 12/1994 | Wallace et al. | 29/889.21 |
| 5,499,904 A | 3/1996 | Wallace et al. | 416/230 |
| 5,531,567 A * | 7/1996 | Hulls | 416/87 |
| 5,616,963 A | 4/1997 | Kikuchi | 290/55 |
| 5,663,600 A | 9/1997 | Baek et al. | 290/55 |
| 5,980,353 A * | 11/1999 | Wu | 416/210 R |
| 5,982,046 A | 11/1999 | Minh | 290/55 |
| 6,015,258 A | 1/2000 | Taylor | 415/4.4 |
| 6,023,105 A * | 2/2000 | Youssef | 290/54 |
| 6,024,325 A * | 2/2000 | Carter, Jr. | 244/17.25 |
| 6,059,531 A * | 5/2000 | Tai | 416/220 A |
| 6,062,820 A * | 5/2000 | Wang | 416/210 R |
| 6,261,064 B1 * | 7/2001 | Tang | 416/210 R |
| 6,352,411 B1 * | 3/2002 | Bucher et al. | 416/210 R |
| 6,382,918 B1 * | 5/2002 | Tang | 416/210 R |
| 6,390,777 B1 * | 5/2002 | Kerr, Jr. | 416/204 R |
| 6,431,834 B1 * | 8/2002 | Lackey et al. | 416/205 |
| 6,891,280 B2 | 5/2005 | Siegfriedsen | 290/44 |
| 6,979,170 B2 * | 12/2005 | Dery et al. | 415/4.2 |
| 7,344,353 B2 * | 3/2008 | Naskali et al. | 415/4.2 |
| 7,739,775 B2 * | 6/2010 | Shimanski | 24/265 H |
| 2004/0120820 A1 * | 6/2004 | Dery et al. | 416/197 A |
| 2006/0066111 A1 * | 3/2006 | Suryanarayanan et al. | 290/44 |
| 2006/0257240 A1 * | 11/2006 | Naskali et al. | 415/4.4 |
| 2007/0029807 A1 * | 2/2007 | Kass | 290/55 |
| 2008/0036215 A1 * | 2/2008 | Gizaw et al. | 290/55 |
| 2009/0072439 A1 * | 3/2009 | Karem | 264/258 |
| 2009/0072544 A1 * | 3/2009 | Pao | 290/55 |
| 2009/0191063 A1 * | 7/2009 | Baker et al. | 416/227 R |
| 2009/0196758 A1 * | 8/2009 | Baker et al. | 416/233 |

FOREIGN PATENT DOCUMENTS

| | | |
|---|---|---|
| DE | 197 41 495 A1 | 3/1999 |
| DE | 198 59 865 A1 | 8/2000 |
| JP | 2001-020849 | 1/2001 |
| WO | 96/30647 | 10/1996 |

\* cited by examiner

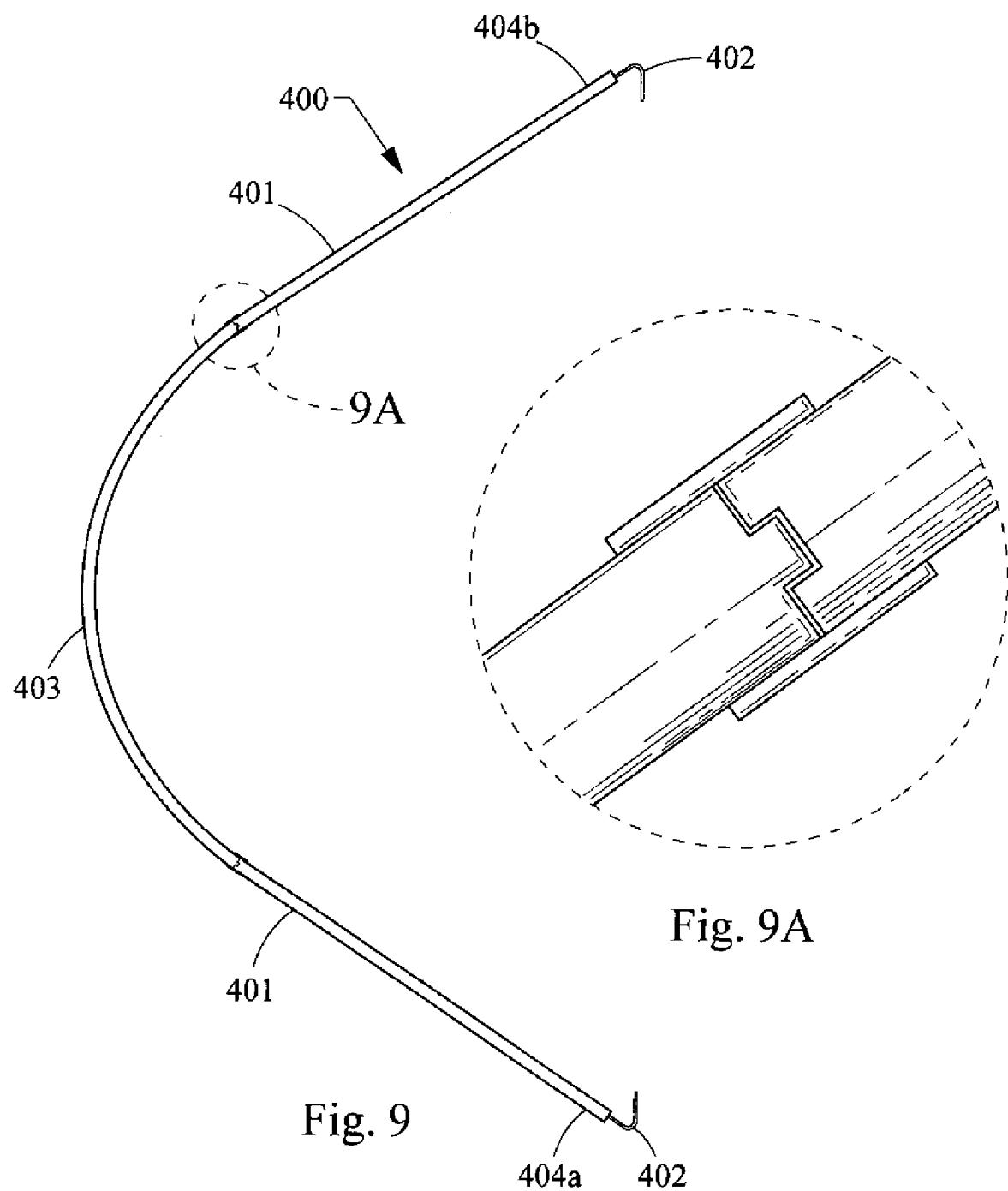

VERTICAL AXIS WIND SYSTEM

CROSS-REFERENCE TO RELATED APPLICATIONS

This application claims the benefit of PCT/US2007/069956, filed May 30, 2007, and U.S. Provisional Application Ser. No. 60/803,420, filed on May 30, 2006, entitled "IMPROVED VERTICAL AXIS WIND TURBINE," the entire contents of which are incorporated herein by reference.

BACKGROUND OF THE INVENTION

1. Field of the Invention

The present invention is directed to wind power systems. More specifically, the invention relates to vertically oriented wind systems.

2. Description of Related Art

Vertical axis wind systems offer a number of advantages over horizontal axis wind systems. For example, vertical axis systems can harness wind from any direction without reorienting any of the structure as required with a horizontal axis wind system. However, existing vertical axis wind systems may have difficulties with, for instance, aerodynamic efficiency, vibrations and securing blade assemblies in position. With interest growing in wind power to replace or supplement power received from fossil fuels and nuclear sources, there is a corresponding interest in vertical axis wind systems.

In view of the above, it is apparent that there exists a need for an improved vertical axis wind system.

SUMMARY OF THE INVENTION

In satisfying the above need, as well as overcoming the enumerated drawbacks and other limitations of the related art, the present invention provides a vertical axis wind system for use in power generation. The vertical axis wind system includes a stationary base with a generator and an elongate shaft rotatably supported by the base. The elongate shaft extends vertically from a lower end to an upper end and defines a central axis. The elongate shaft operably engages the generator. Two or more arcuate blade assemblies have a first end and second end, the first end being directly attached proximate to a lower end of the elongate shaft and the second end being directly attached proximate to the upper end of the elongate shaft. The arcuate blade assemblies are structured to rotate the elongate shaft in response to aerodynamic forces for the generation of power.

In one aspect, the elongate shaft includes a tubular wall defining a hollow interior. An inner post includes a bottom part to a top part. A bearing is disposed between the tubular wall of the elongate shaft and the inner post for relative rotation.

In another aspect the inner post has a diameter and a height selected to support itself and the elongate shaft. In one example, this is achieved by an aspect ratio of the diameter to the height of the inner shaft of about 0.01 to 0.02.

In still another aspect, the generator includes a rotor and a stator. In one instance, the rotor may directly engage the elongate shaft such that one rotation of the elongate shaft results in one rotation of the rotor. In another instance, the rotor may indirectly engaging the elongate shaft such that one rotation of the elongate shaft results in more than one rotation of the rotor.

In yet another aspect, the generator may be configured to operate as an electrical motor when electrical power is applied to the generator. A vibration sensor may be attached to the wind system and configured to monitor vibrations. The sensor is connected to a control system configured to apply electrical power to the generator to increase the rotational speed of the elongate shaft to avoid resonate frequencies of the system.

In one instance, a braking system may be disposed between the stationary base the elongate shaft for slowing rotation of the elongate shaft.

In another instance, a blade attachment assembly may be disposed adjacent the lower end and the upper end of the elongate shaft for attaching the blade assemblies proximate to the elongate shaft. The blade attachment assembly includes at least two blade attachment brackets being equally spaced about the elongate shaft. The brackets extend axially along a portion of the central axis and radially protrude a short distance from the elongate shaft. The arcuate blade assemblies include complimentary blade flanges engaging the attachment brackets. The blade flanges may have, for example, a forked end member curved back upon itself.

In one aspect, the blade assemblies define a curved path between the lower and upper ends of the elongate shaft. A skin defines an airfoil shape along the chord length configured for generating aerodynamic forces.

In another aspect, at least one spar may extend within the skin along the curved path with a plurality of ribs being arranged along the spar and corresponding to the airfoil shape. The spars may be a pair of parallel spars, a pair of tubular spars, an "H-shaped" spar, a "U-shaped" spar, and a "T-shaped" spar.

In still another aspect, each of the arcuate blade assemblies are formed of a curved section interconnected between two straight sections. Optionally, a safety cable may be attached between each of the arcuate blade assemblies and the elongate shaft.

The present invention also includes a method of operating a vertical axis wind system to avoid resonate frequencies of the wind system. The method includes measuring the resonate frequencies of the vertical axis wind system and accelerating or decelerating the rotation of the elongate shaft to avoid the resonate frequencies of the vertical axis wind system. The acceleration of the elongate shaft may be achieved by applying electrical power to the generator.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The invention is illustrated in the accompanying drawings, which are meant to be exemplary and not limiting, in which like reference numbers are intended to refer to like or corresponding parts, and in which:

FIG. 9 is a side view of the blade assembly of FIG. 1;

FIG. 9A is a detail view of a joint between two sections of the blade assembly of FIG. 9;

DETAILED DESCRIPTION OF THE INVENTION

Figure 1:
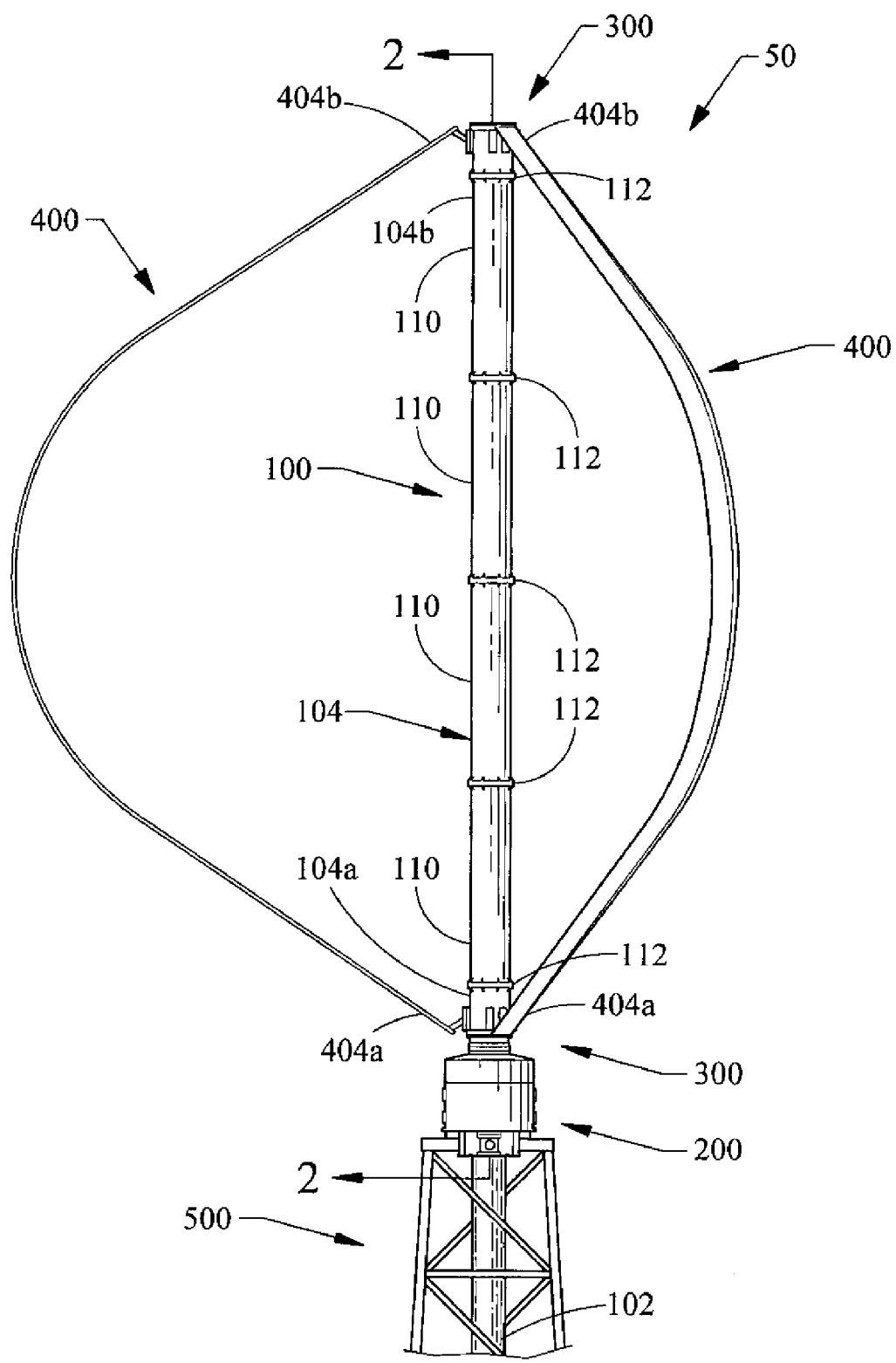
FIG. 1 is a side view of a vertical axis wind system in accordance with the present invention.

Referring now to FIG. 1, a vertical axis wind system of the present invention is illustrated therein and designated at 50. As its primary components, the vertical axis wind system (hereinafter referred to as "wind system") includes a center post assembly 100, a stationary base 200, a blade attachment assembly 300 and a arcuate blade assembly 400. The wind system 50 is supported by a foundation 500 that extends around and supports a portion of the center post assembly 100. The wind system 50 may be disposed at ground level, over a body of water, on top of a rooftop of a building.

Figure 2:
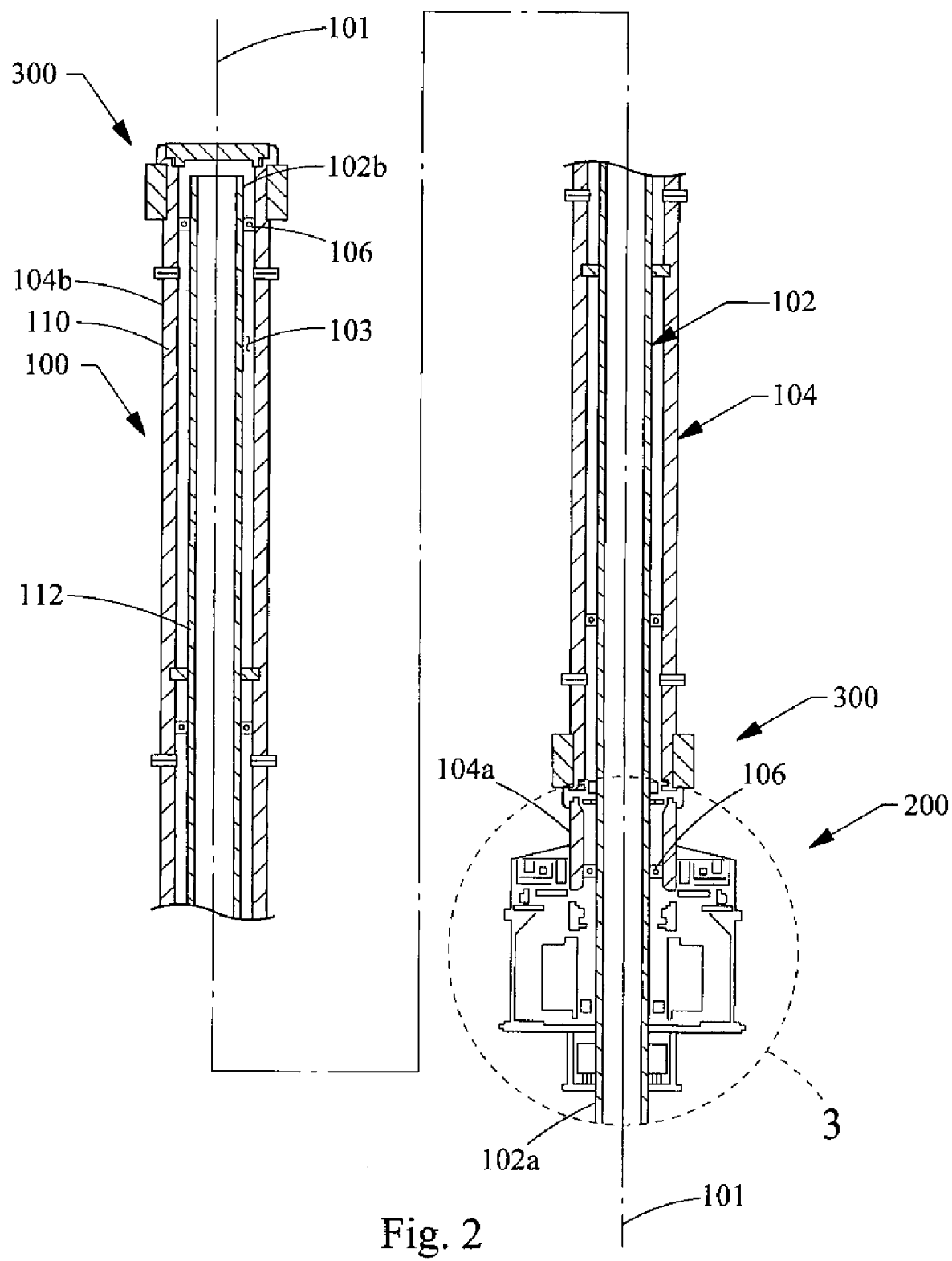
FIG. 2 is section view of a center post assembly of FIG. 1.

As best shown in FIG. 2, the center post assembly 100 extends vertically along a central axis 101. The terms "vertically" and "vertical", as used herein, encompass deviations of up to 10 degrees from perfectly vertical. The center post assembly 100 includes an inner post 102 coaxially arranged within an elongate shaft 104. The elongate shaft 104 is rotatably coupled to the stationary base 200 and is in engagement with a generator 202 disposed within the base 200. The elongate shaft 104 extends vertically from a lower end 104a to an upper end 104b along the vertical central axis 101 and the inner post 102 extends from a bottom part 102a to a top part 102b. The elongate shaft 104 has a tubular wall forming a hollow interior 103 into which the inner post 102 is disposed.

Figure 3:
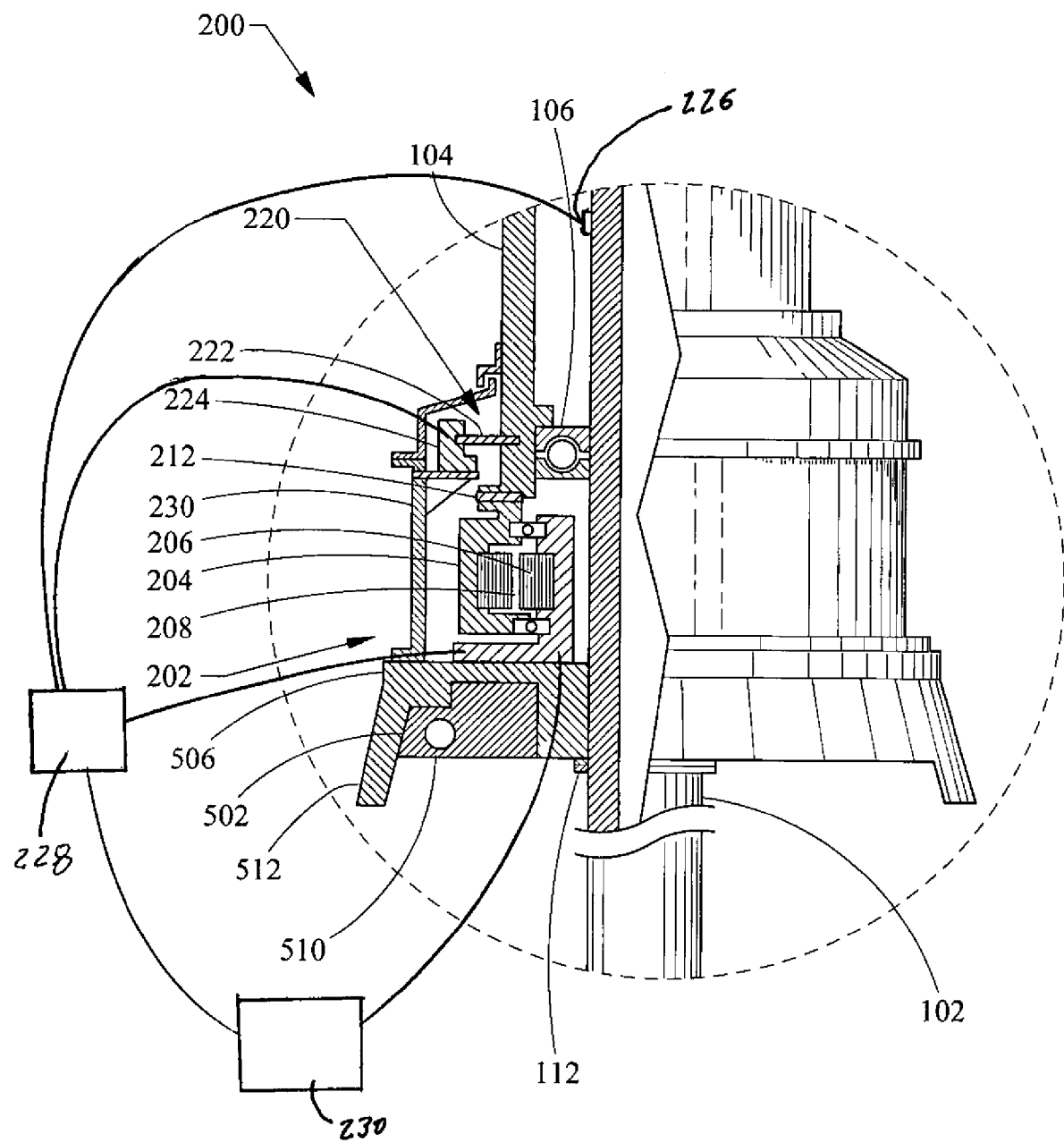
FIG. 3 is a detail view of a power generation system of FIG. 2.

In one embodiment, the elongate shaft 104 is spaced from the inner post 102 by one or more bearings 106 (e.g. slewing or turntable bearings as shown in FIGS. 2 and 3) disposed at appropriate intervals along a length of the shaft 106 to facilitate rotation of elongate shaft 104 around the inner post 102 and to maintain a desired gap therebetween. In the example of FIG. 2, one bearing 106 is disposed adjacent the lower end 104a of the elongate shaft 104 and another bearing is disposed adjacent the upper end 104b.

The inner post 102 and the elongate shaft 104 each are made of a plurality of sections 110 having, for example, end flanges 112 adapted for securing the sections together. The sections 110 may be secured together using, for example, nut and bolt fasteners or other suitable fastening means including welding, soldering, adhesives or band clamps. This structure for the inner post 102 and the elongate shaft 104 provides for ease of transport and assembly and also allows the wind system 50 to be built with varying heights depending on the needs of a particular application.

In one example, the inner post 102 may be assembled from sections 18 feet in length and 30 inches in outside diameter. The elongate shaft 104 may be assembled from sections 18 feet in length but with a 42 inch outside diameter. The elongate shaft 104 and inner post 102 may, for instance, have a wall thickness of 1 inch, resulting in a gap between the post 102 and the shaft 104 of approximately 5 inches on either side of inner post 102. One or more of the sections may have their length adjusted as necessary to meet a final height of the center post assembly 100. Referring to FIG. 2, the flanges on the inner post 102 and the elongate shaft 104 may be spaced in a staggered arrangement to one another to simplify assembly and provide clearance with an inner wall of the elongate shaft 104.

In some non-limiting examples, the inner post 102 and the elongate shaft 104 may each be formed from commercially available steel or aluminum pipes having sufficient structural integrity to support the operating wind system 50. One or both of the inner post 102 and elongate shaft 104, or portions thereof, may alternatively be formed of other materials also suitable for the operation of the wind system 50. The elongate shaft 104 for instance may be formed of lightweight materials of sufficient structural strength to support the arcuate blade assemblies 400. The inner post 102 is formed of more robust materials since it is configured to structurally support the entire structure. The inner post 102 may be solid or constructed from hollow pipes. If hollow pipes are used, such pipes may optionally be filled prior to or following assembly with concrete, a honeycomb material, structural foam or other suitable reinforcements.

In one embodiment, it is desirable to support the center post assembly 100 without the assistance of guy wires. To achieve this, an aspect ratio of a diameter of the inner post 102 to a height of the inner post 102 is preferably in the range of about 0.005 to 0.03, and more preferably about 0.01 to 0.02. For example, if a center post assembly 100 has a height of 150 feet, the inner post 102 may have a height of 150 feet and a diameter of 2.5 feet. This results in an aspect ratio of 0.017. If the elongate shaft 104 has a height of 80 feet, the foundation 500 will require a height of approximately 70 feet (minus a height of the stationary base 200) to surround and support the remainder of inner post 102 (see FIGS. 10 and 11).

Referring to FIG. 3, the generator 202 of the stationary base 200 includes a generator rotor 204 disposed relative to a generator stator 206 and spaced apart by a gap 208. While the rotor 204 is shown disposed about the stator 206, it should be appreciated that in other embodiments the rotor may be disposed within the stator without falling beyond the scope of the present invention. The generator 202 is configured to generate electrical power upon relative rotation between the rotor 204 and the stator 206. Conversely, the generator 202 may also be configured to act as a motor. In this case, the application of electrical power to the generator 202 will cause relative rotation between the rotor 204 and the stator 206.

The elongate shaft 104 is directly engaging the generator rotor 204 as shown in FIG. 3. In this example, a flexible connector 212, such as a rubber coupling, may optionally be disposed between the rotor 204 and a flange of the elongate shaft 104 to dampen the transfer of vibrations between the two elements. It should be appreciated that in other embodiments the elongate shaft 104 may indirectly engage the generator rotor 204 (not shown). In this embodiment, for example, a torque converter assembly, a planetary or other gear set, a system of pulleys, or a mechanical clutch assembly may provide the indirect engagement. An optional braking system 220 may be disposed within the base 200 configured to engage the elongate shaft 104. In this example, the braking system 220 may include a brake disc 222 and brake calipers 224 configured to slow the rotation of elongate shaft 104. A housing 230 encloses the generator 202 and the braking system 220.

In some embodiments, a vibration sensor 226 may be attached to, for example, the inner post 102 of the wind system 50. One or more vibration sensors 226 may be used to monitor the frequency and amplitude of vibrations of the wind system 50 as the vibrations change with different rotational speeds of the elongate shaft 104 and the generator rotor 204. Each embodiment of the wind system 50 has different resonate frequencies that result in vibrations having a significant magnitude. If the elongate shaft 104 rotates at a frequency corresponding to a resonate frequency, the resulting vibrations may damage the wind system 50. Therefore, it is desirable to avoid operating the wind system 50 at those frequencies. Thus, some embodiments may include a control system 228 connected to the vibration sensor 226, the braking system 220, and the generator 202 and configured to increase or decrease the rotational speed of the elongate shaft 104 by respectively applying electrical power to the generator or engaging the braking system 220. Optionally, the generator 202 may be connected to a resistor load bank 230. The resistor load bank 230 may be configured to apply differing amounts of load to the generator 202 to, for example, decrease the rotational speed of the elongate shaft 104. In this embodiment, the control system 228 may also be connected to the resistor load bank 230 and be configured to apply a load to the generator 202 to slow the elongate shaft 104 and prolong the life of the braking system 220.

Referring back to the example of FIG. 1, two of three arcuate blade assemblies 400 are visible. Depending on the power required for a particular application, two or more arcuate blade assemblies 400 are provided and are spaced equally about the elongate shaft 104. A diameter 401 of the blade assemblies 400, best shown in FIG. 11, may also be varied to meet various power needs. Each of the arcuate blade assemblies 400 have a first end 404a and second end 404b, with the first end 404a being directly attached proximate to the lower end 104a of the elongate shaft 104 and the second end 404b being directly attached proximate to the upper end 104b of the elongate shaft 104. The arcuate blade assemblies 400 are shaped so as to define a curved path between the lower and upper ends 104a, 104b of the elongate shaft 104 and are structured to rotate the elongate shaft for power generation in response to aerodynamic forces.

Figure 4:
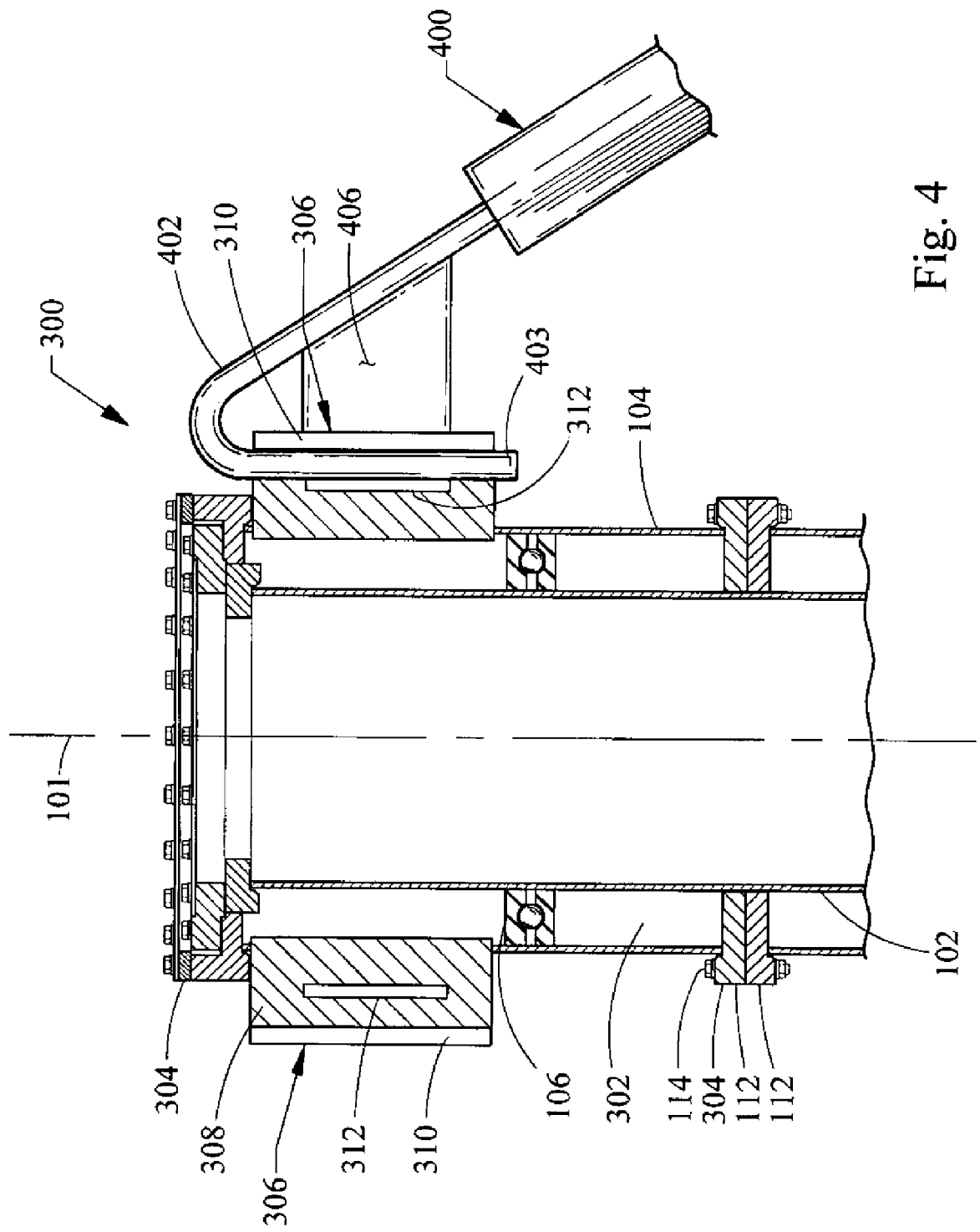
FIG. 4 is a detail view of an upper blade attachment assembly of FIG. 2.
Figure 5:
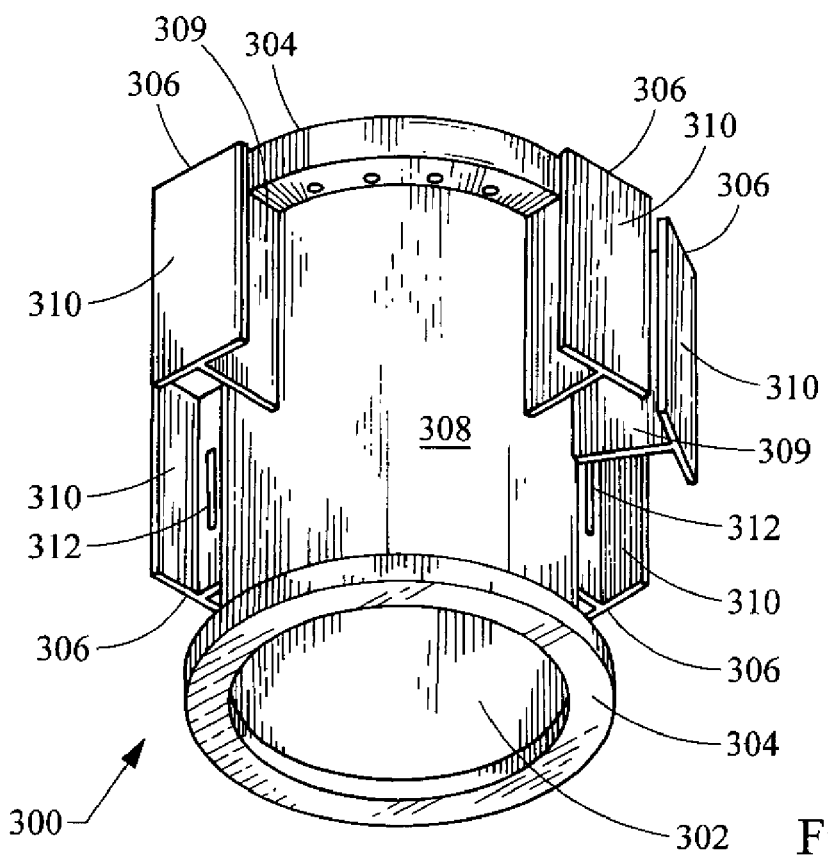
FIG. 5 is a perspective view of the blade attachment assembly of FIG. 4.
Figure 6:
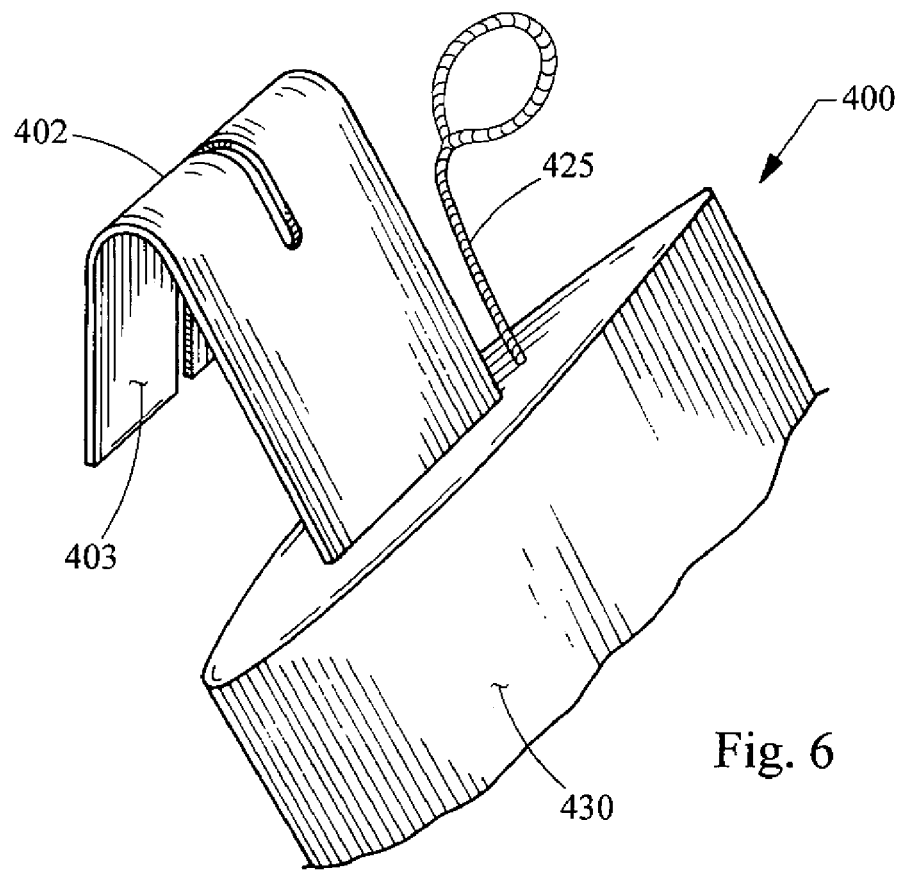
FIG. 6 is a perspective view of one end of the blade assembly of FIG. 4.

The blade attachment assembly 300 for attaching the ends of the blade assemblies proximate to the elongate shaft 104 is shown in FIGS. 4-6. The blade attachment assembly 300 has a hollow cylindrical portion 302 with flanged ends 304 adapted for attaching to upper and lower ends of the elongate shaft 104. One blade attachment assembly 300 is disposed adjacent to both the lower end 104a and the upper end 104b of the elongate shaft 104. At least two blade attachment brackets 306 extend radially outward a short distance from an outer wall 308 of the cylindrical portion 302 with circumferential spacing corresponding to that required for the blade assemblies 400. Depending on the structural needs of a particular application, the short distance may, for example, be in the range of about four to twelve inches. The example of FIG. 5 is configured to accommodate either three or four blade assemblies. Each blade attachment bracket 306 of this example includes an attachment plate 309 and an attachment lip 310 perpendicular to the attachment plate 309. The attachment plate 309 extends perpendicular to the elongate shaft 104 and the attachment lip 310 protrudes perpendicular to the attachment plate 309. An optional aperture 312 may also be provided. Each end of arcuate blade assembly 400 includes a complimentary end member configured to engage the attachment brackets 306.

In the example of FIG. 6, the complimentary end member is in the form of a forked end member 402 that is curved back upon itself to form an inside surface 403 that hooks over and surrounds a portion of the attachment lip 310. The forked end member 402 is attached to the attachment lip 310 using at least one of bolts, rivets, welding, and combinations thereof. An optional clamping plate may be provided through the aperture 312 in contact with the forked end member 402 to reinforce its attachment to the lip 310. In addition, other examples may include a gusset plate 406 engaging the attachment lip 310 along one side and part of the inner surface 403 along another side.

Referring to FIGS. 7-9A, the blade assembly 400 includes a primary structure 422 and a skin 430. The primary structure 422 has a leading edge 432 and a trailing edge 434 spaced apart by a chord length 420. One or more spars 426 extending along the length of the blade assembly 400 and supports a plurality of ribs 428 extending along the chord length 420. The spars 426 and the ribs 428 are preferably formed of a lightweight material with sufficient structural strength for the size and intended purpose of the blade assembly. This material can be steel, aluminum, a composite or a combination of materials. The spars 426 are preferably formed in an airfoil or other aerodynamic shape suitable for wind system power generation. The spars 426 are provided in one of a variety of embodiments. FIG. 8A shows a pair of parallel extending spars 426, FIG. 8B shows an H-shaped spar 426, FIG. 8C shows a pair of tubular spars 426 having a rectilinear cross section, FIG. 8D shows a U-shaped spar 426 and FIG. 8E shows a T-shaped spar 426.

Figure 7:
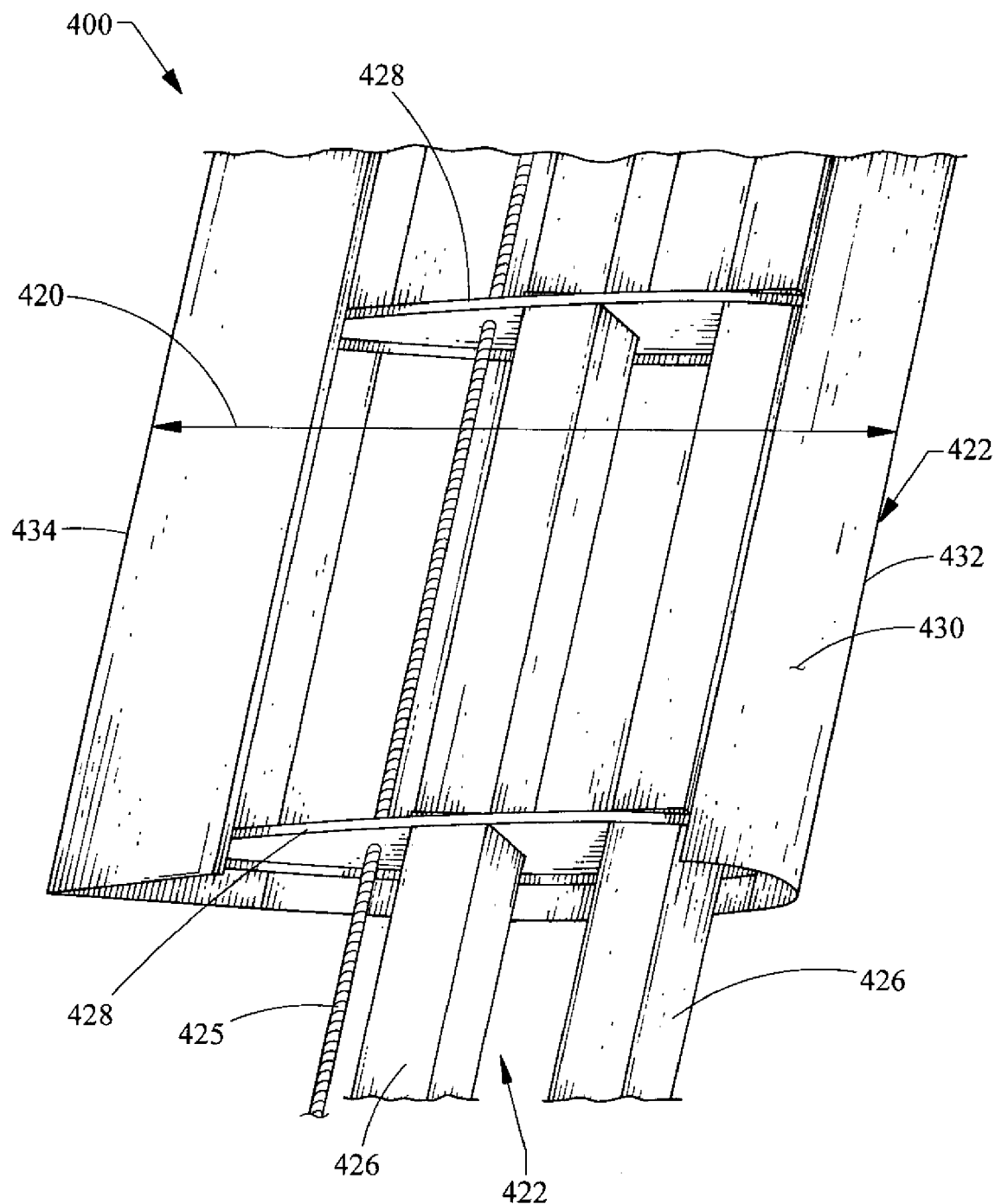
FIG. 7 is a perspective view of a portion of the a blade assembly of FIG. 1.
Figure 8A:
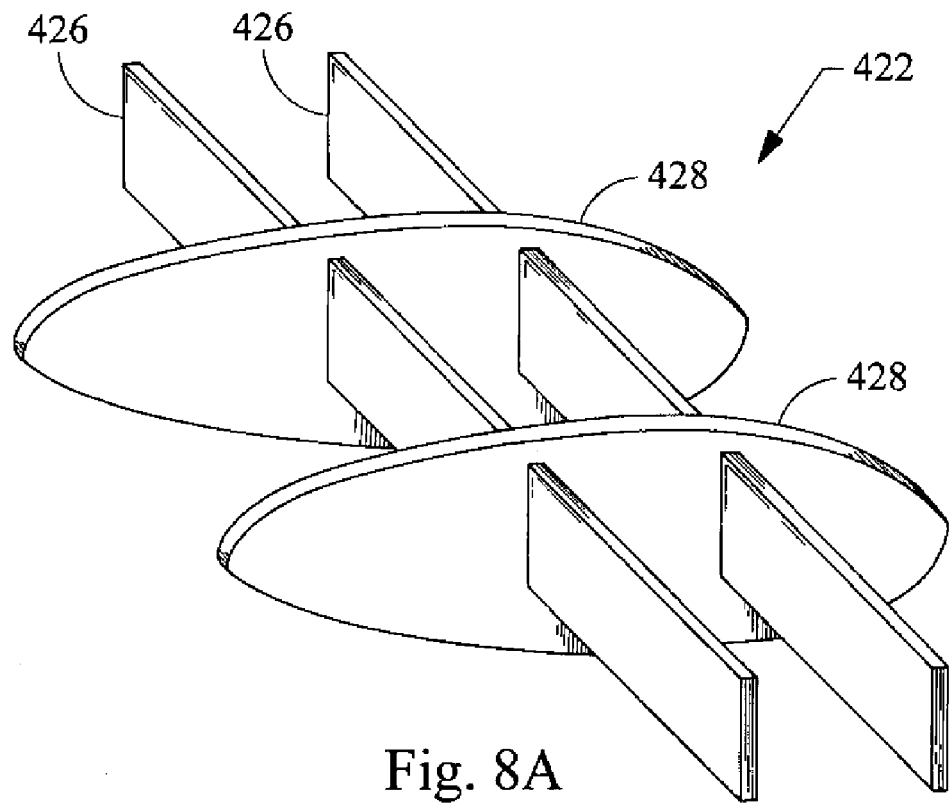
FIGS. 8A-8E are partial perspective views of a portion of the blade assembly of FIG. 7.
Figure 8B:
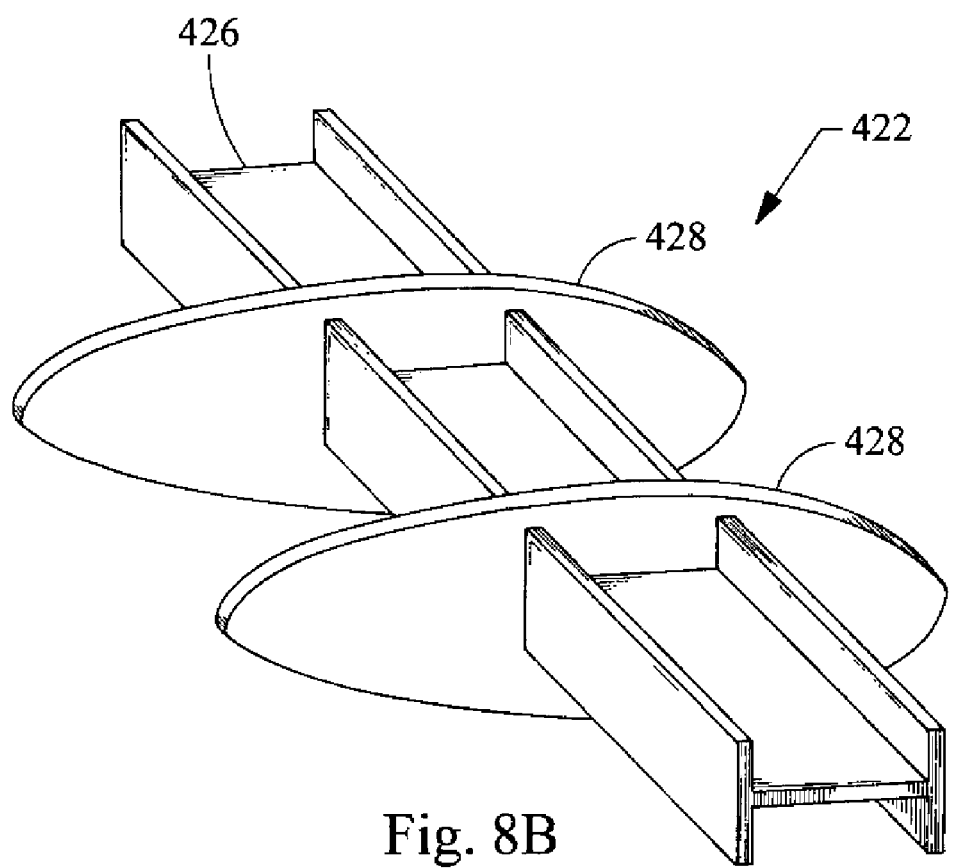
Figure 8C:
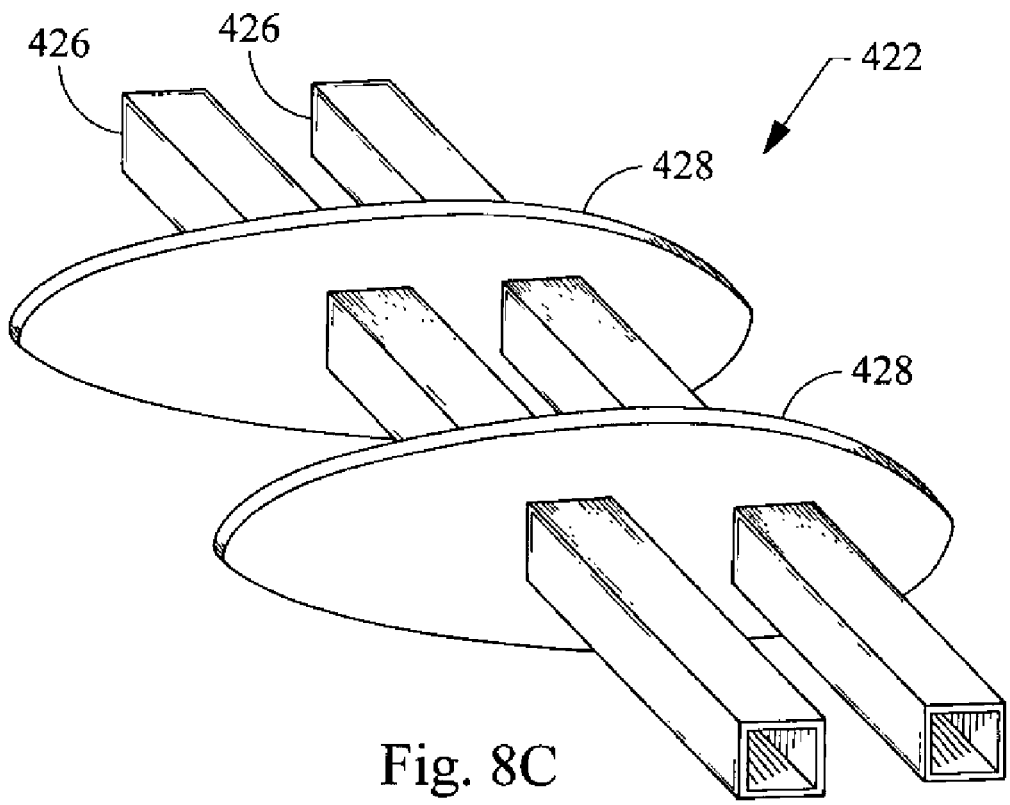
Figure 8D:
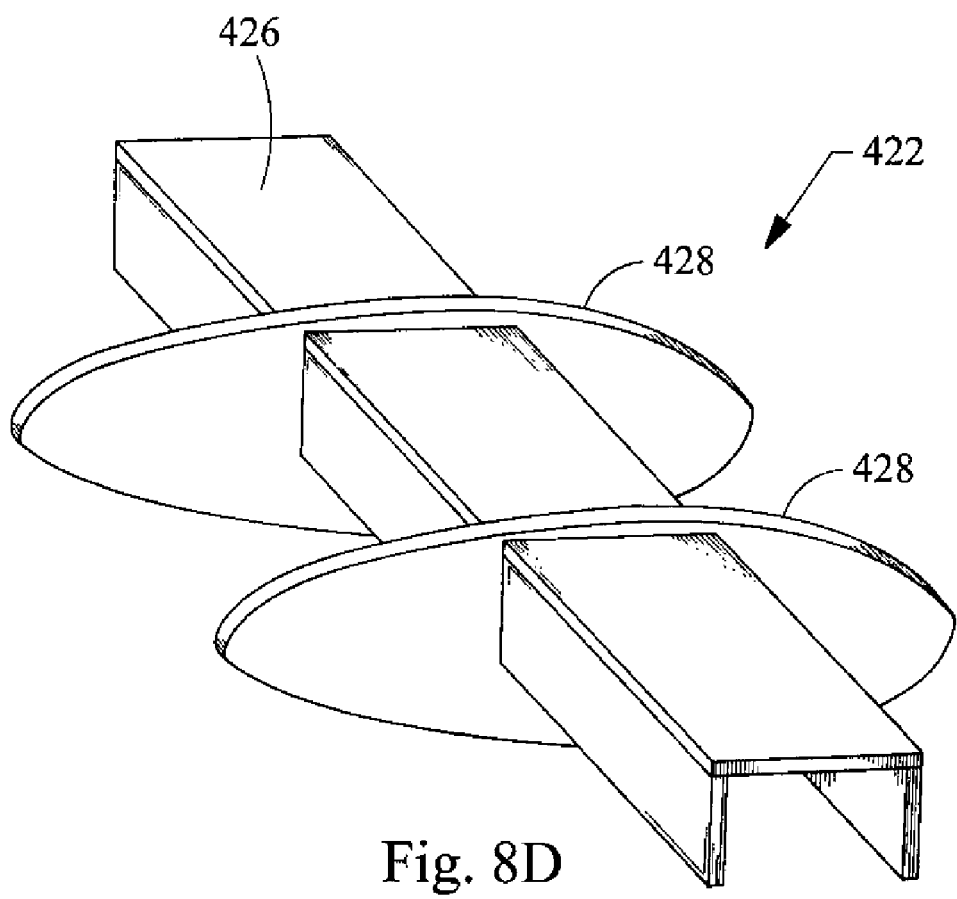
Figure 8E:
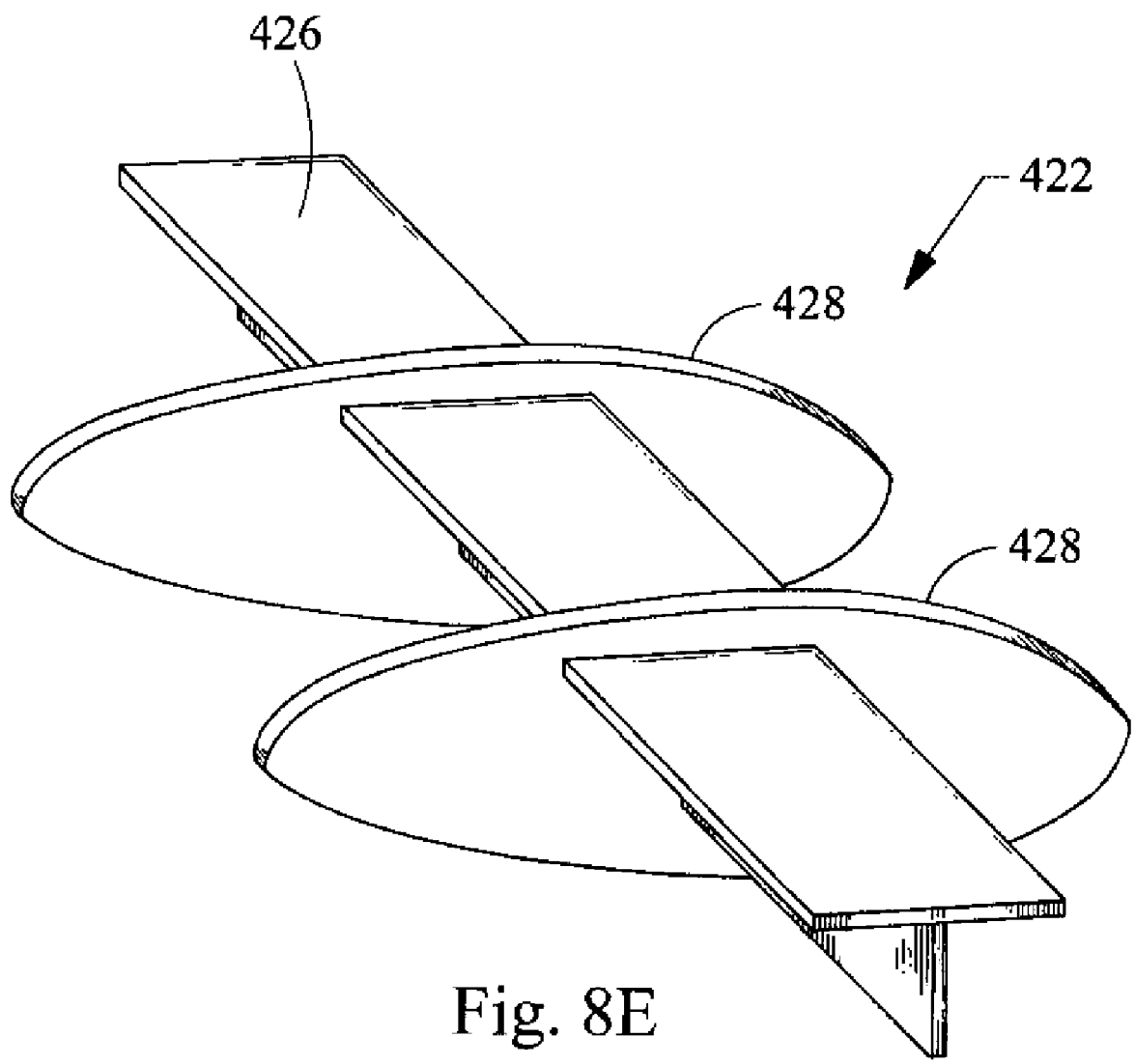

Optionally, a safety cable may be attached between the arcuate blade assembly 400 and the elongate shaft 104. In one example, best shown in FIGS. 6 and 7, a safety cable 425 extends within and along the entire length of each of the blade assemblies 400 before protruding from either end and being attached to the elongate shaft 104 (not shown). As shown in FIG. 7, the cable may run adjacent to one of the spars 426 within the skin 430. The safety cable 425 provides additional retention of each of the blade assemblies 400 in the event of a failure of any part of the blade attachment assemblies 300 or the complimentary end members.

The skin 430 is disposed over the ribs to define an aerodynamic blade surface suitable for power generation. The skin may be formed of any suitable material including steel, aluminum, wood, plastic, composite fibers using rolled, stamped, extruded, molded, wound, hydro-formed or net shaped manufacturing processes. The skin 430 may be painted, coated or formed from any material that reduces drag and prevents ice build up such as plastic or polyurethane. The skin 430 may be attached to ribs using mechanical fasteners, ring-weld, laser-weld, spot-weld, stitch-weld, rivets, adhesives or any other suitable means of fastening.

Each blade assembly 400 may be formed of multiple interconnected sections. As shown in the non-limiting example of FIG. 9, each blade assembly 400 is formed of three sections. In this example, a curved section 403 is interconnected between two straight sections 401. One end of each of the straight sections 401 may include, for example, the forked end member 402 described above. FIG. 9A shows one example of a joint for interconnecting the straight sections 401 with the curved section 403.

Figure 10:
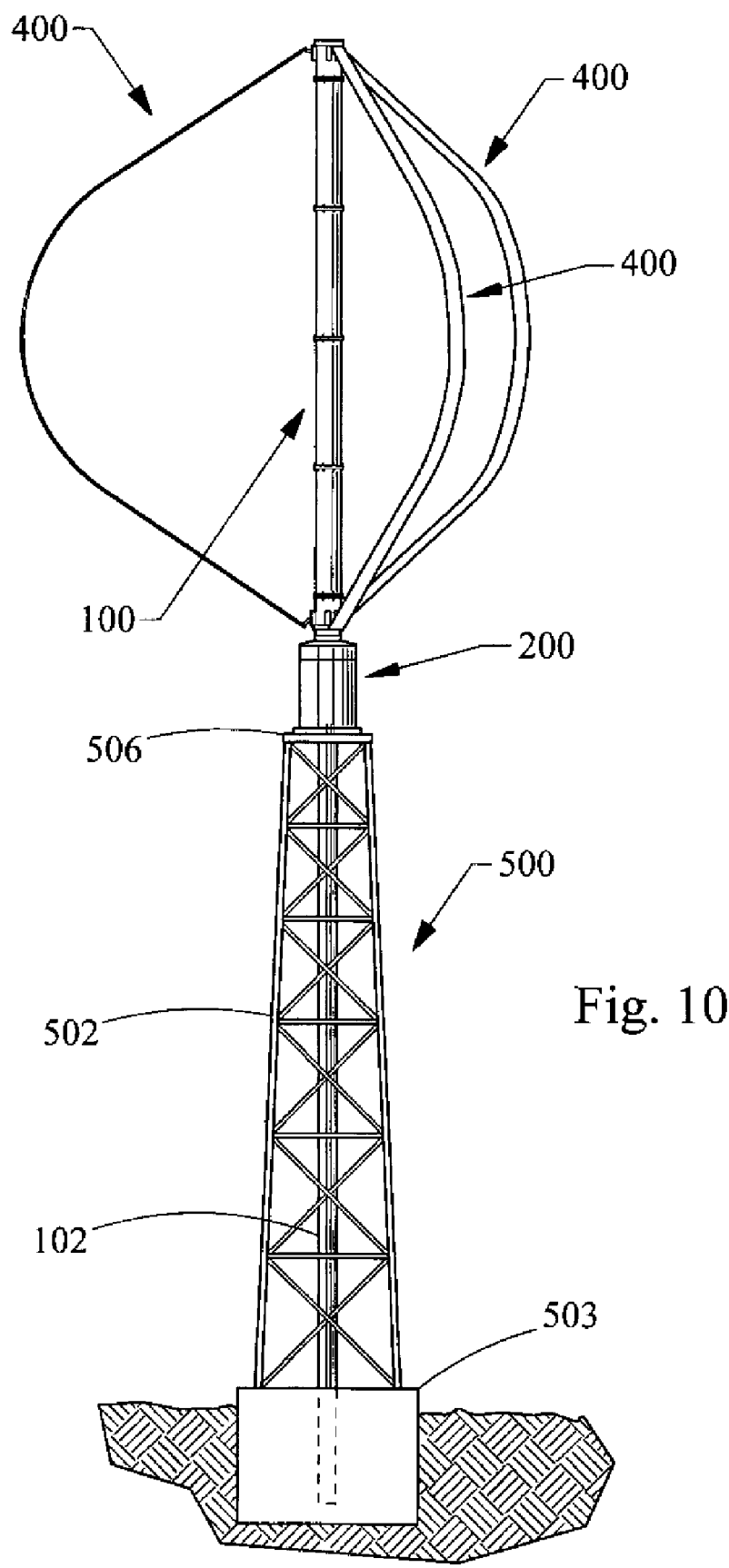
FIG. 10 is a side view of another embodiment of the vertical axis wind system.
Figure 11:
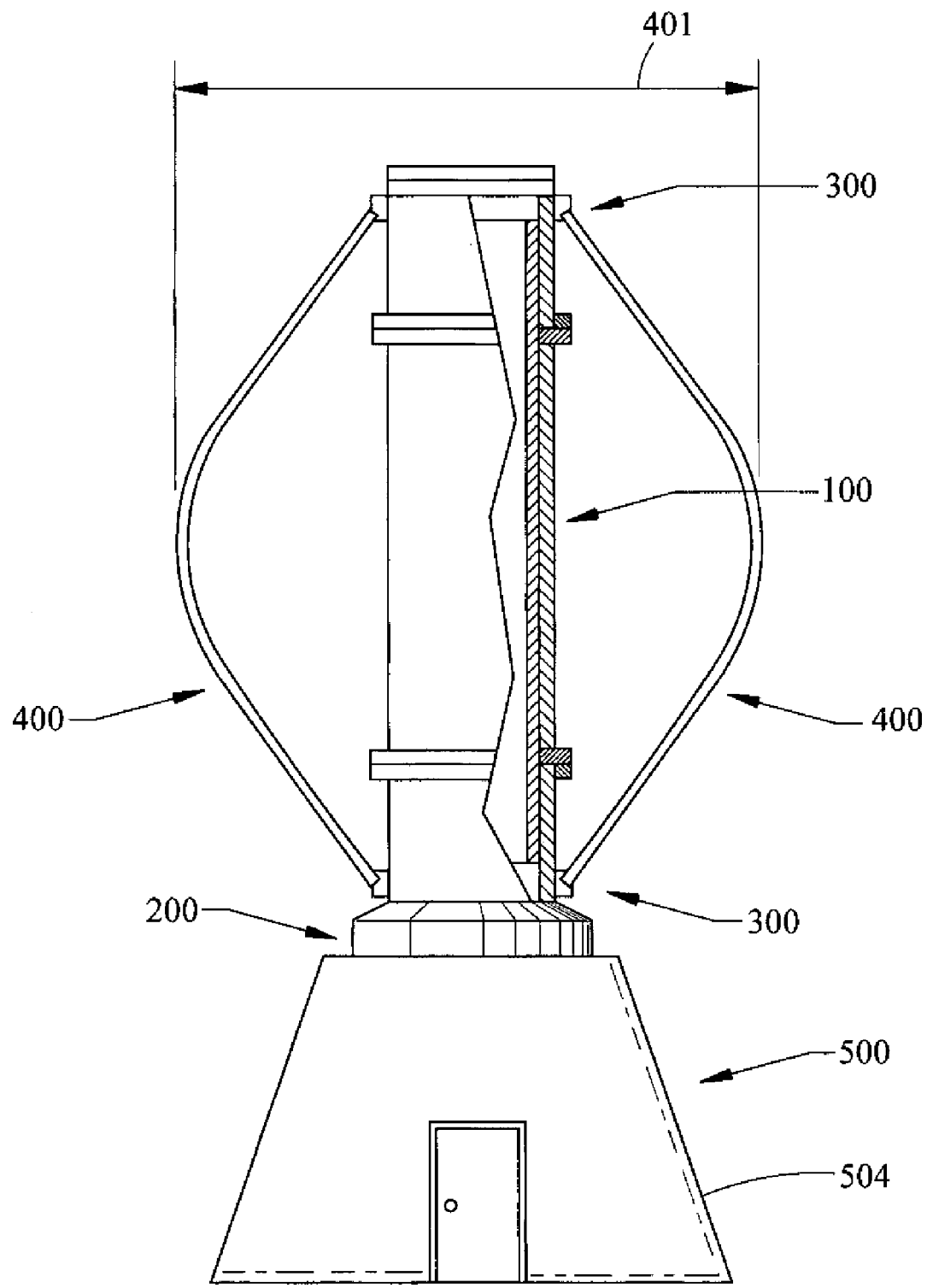
FIG. 11 is a side view of yet another embodiment of the vertical axis wind system.

As noted above, it is desirable to support the center post assembly 100 by the inner post 102 without the assistance of guy wires. Accordingly, various foundations 500 may support the inner post 102. One example of the foundation 500 includes the truss structure 502 shown in FIG. 10 or the concrete structure 504 shown in FIG. 11. In FIG. 10, the inner post 102 may be secured through a base plate 506 that is attached to the foundation 500. The inner post 102 preferably extends through the foundation 500 to engage a bottom surface 503.

The present invention also includes a method of operating the wind system to avoid damage from resonate frequencies as described above. The method includes measuring the resonate frequencies of the wind system and exposing the wind system to wind to cause rotation of the elongate shaft and generate power. To avoid the resonate frequencies, the rotation of the elongate shaft is accelerated or decelerated to pass quickly through speeds which result in resonate frequencies thereby minimizing the time spent at those frequencies. Preferably, but not required, the rotation of the elongate shaft may be accelerated by applying electrical power to the generator and decelerated by applying an electrical resistance load to the generator and/or engaging a mechanical braking system. A controller may be coupled between the generator, a resistance load bank and the braking system and configured to accelerate or decelerate as necessary.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A vertical axis wind system for use in power generation, the wind system comprising:
    a stationary base including a generator and an elongate shaft rotatably supported by the base, the elongate shaft extending vertically from a lower end to an upper end and defining a central axis, the elongate shaft operably engaging the generator;
    at least two arcuate blade assemblies, each arcuate blade assembly having a first end and second end, the first ends being directly attached proximate to a lower end of the elongate shaft and the second ends being directly attached proximate to the upper end of the elongate shaft, the at least two arcuate blade assemblies structured to rotate the elongate shaft in response to aerodynamic forces acting on the at least two arcuate blade assemblies for the generation of power; and
    a blade attachment assembly being disposed adjacent the lower end and the upper end of the elongate shaft for attaching the at least two blades thereto, the blade attachment assembly including at least two blade attachment brackets being equally spaced about the elongate shaft, axially extending along a portion of the central axis, and radially protruding from the elongate shaft, the at least two arcuate blade assemblies including complementary blade flanges engaging the attachment brackets, wherein the blade attachment brackets include an attachment plate extending from the elongate shaft and an attachment lip attached perpendicular to the attachment plate.

2. The wind system of claim 1 wherein the elongate shaft includes a tubular wall defining a hollow interior.

3. The wind system of claim 2 further comprising an inner post being disposed within the hollow interior along the central axis and extending from a bottom part to a top part, and at least one bearing being disposed between the tubular wall of the elongate shaft and the inner post for relative rotation therebetween.

4. The wind system of claim 3 wherein two bearings are respectively disposed adjacent the lower end and upper end of the elongate shaft.

5. The wind system of claim 1 wherein the inner post has a diameter and a height selected to support itself and the elongate shaft.

6. The wind system of claim 5 wherein an aspect ratio of the diameter to the height is about 0.01 to 0.02.

7. The wind system of claim 1 wherein the elongate shaft is formed of at least two interconnected shaft segments.

8. The wind system of claim 1 wherein the generator includes a rotor disposed relative to a stator.

9. The wind system of claim 8 wherein the rotor is directly engaging the elongate shaft such that one rotation of the elongate shaft results in one rotation of the rotor.

10. The wind system of claim 8 wherein the rotor is indirectly engaging the elongate shaft such that one rotation of the elongate shaft results in more than one rotation of the rotor.

11. The wind system of claim 8 wherein the generator is configured to operate as an electrical motor when electrical power is applied to the generator.

12. The wind system of claim 11 wherein at least one vibration sensor is attached to the wind system and configured to monitor vibrations, the sensor being connected to a control system configured to apply electrical power to the generator to increase the rotational speed of the elongate shaft.

13. The wind system of claim 1 further comprising a braking system being disposed within the stationary base and engaging the elongate shaft.

14. The wind system of claim 13 wherein the braking system includes a brake disc attached to the lower end of the elongate shaft and brake calipers attached to the stationary base, the brake calipers frictionally engaging the brake disc for slowing rotation of the elongate shaft.

15. The wind system of claim 1 further comprising a resistor load bank being attached to the generator and configured to apply a load to the generator for slowing rotation of the elongate shaft.

16. The wind system of claim 1 wherein the blade flange includes a forked end member curved back upon itself to form an inside surface, the forked end member engaging the attachment lip such that the attachment lip is partially surrounded by the inside surface.

17. The wind system of claim 16 further comprising an aperture being provided in the attachment plate adjacent the forked end member and a clamping plate being provided in the aperture to secure the end member to the attachment bracket.

18. The wind system of claim 17 further comprising a gusset being provided between a portion of the inside surface and the attachment lip.

19. The wind system of claim 16 wherein the attachment plate extends perpendicular to a tangent of the elongate shaft and the attachment lip protrudes perpendicular to the attachment plate.

20. The wind system of claim 1 wherein the at least two arcuate blade assemblies have a leading edge and a trailing edge spaced apart by a chord length, the arcuate blade assemblies defining a curved path between the lower and upper ends of the elongate shaft.

21. The wind system of claim 20 further comprising a skin defining an airfoil shape along the chord length configured for generating aerodynamic forces.

22. The wind system of claim 21 further comprising at least one spar extending within the skin along the curved path and a plurality of ribs being arranged along the spar and corresponding to the airfoil shape and the skin being attached to the ribs.

23. The wind system of claim 22 wherein arcuate blade assemblies include at least one of a pair of parallel spars, a pair of tubular spars, an "H-shaped" spar, a "U-shaped" spar, a "T-shaped" spar, and combinations thereof.

24. The wind system of claim 1 wherein each of the arcuate blade assemblies are formed of at least two interconnected blade sections.

25. The wind system of claim 24 wherein each of the arcuate blade assemblies include a curved section interconnected between two straight sections.

26. The wind system of claim 1 wherein a safety cable is attached between each of the arcuate blade assemblies and the elongate shaft.

27. A method of generating power, the method comprising:
determining the resonate frequencies of a vertical axis wind system, the wind system including a stationary base and an elongate shaft rotatably coupled thereto, the elongate shaft including a tubular wall defining a hollow interior, the elongate shaft extending vertically from a lower end to an upper end along a vertical central axis, the wind system including an inner post disposed within the hollow interior of the elongate shaft along the central axis and extending from a bottom part to a top part, at least one bearing being disposed between the tubular wall of the elongate shaft and the inner post for relative rotation therebetween, wherein the at least one bearing maintains a gap between the tubular wall of the elongate shaft and the inner post, at least two arcuate blade assemblies being attached between the lower end and the upper end of the elongate shaft such that aerodynamic forces acting on the at least two arcuate blade assemblies rotate the elongate shaft to generate electrical power from a generator in engagement with the elongate shaft, a blade attachment assembly disposed adjacent the lower end and the upper end of the elongate shaft for attaching the at least two blade assemblies thereto, the blade attachment assembly including at least two blade attachment brackets being equally spaced about the elongate shaft, axially extending along a portion of the central axis, and radially protruding from the elongate shaft, the at least two arcuate blade assemblies including complementary blade flanges engaging the attachment brackets, wherein the blade attachment brackets include an attachment plate extending from the elongate shaft and an attachment lip attached perpendicular to the attachment plate;
exposing the wind system to wind to rotate the elongate shaft and generate electric power by rotating a rotor of the generator;
accelerating or decelerating the rotation of the elongate shaft to minimize a time spent at the resonate frequencies of the vertical axis wind system.

* * * * *

UNITED STATES PATENT AND TRADEMARK OFFICE
CERTIFICATE OF CORRECTION

| | | |
|---|---|---|
| PATENT NO. | : 7,948,111 B2 | |
| APPLICATION NO. | : 12/324235 | |
| DATED | : May 24, 2011 | |
| INVENTOR(S) | : Dilip K. Nigam et al. | |

It is certified that error appears in the above-identified patent and that said Letters Patent is hereby corrected as shown below:

On the Title Page

Left column, after item (65), insert a new item as follows:

--Related U.S. Application Data

This application is a continuation of PCT/US2007/069956, filed on May 30, 2007, which claims the benefit of Application No. 60/803,420, filed on May 30, 2006.--.

In the Claims

In column 8, claim 14, line 24, after "shaft and brake" replace "calipers" with --calibers--; and in line 25, after "the brake" replace "calipers" with --calibers--.

Signed and Sealed this
Third Day of July, 2012

David J. Kappos
*Director of the United States Patent and Trademark Office*